Sept. 27, 1960 E. R. ZIEGLER 2,953,802
WINDSHIELD CLEANING SYSTEM
Filed Jan. 10, 1958 2 Sheets-Sheet 1
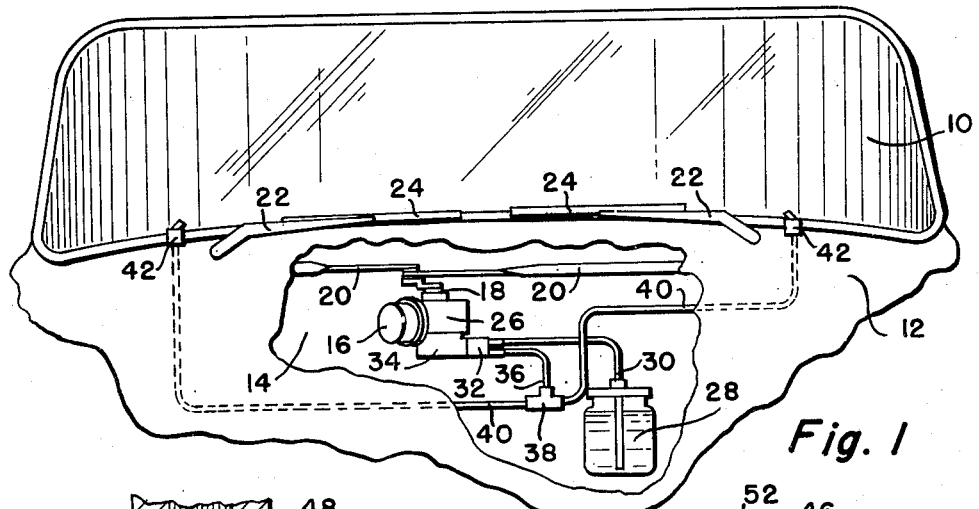
Fig. 1
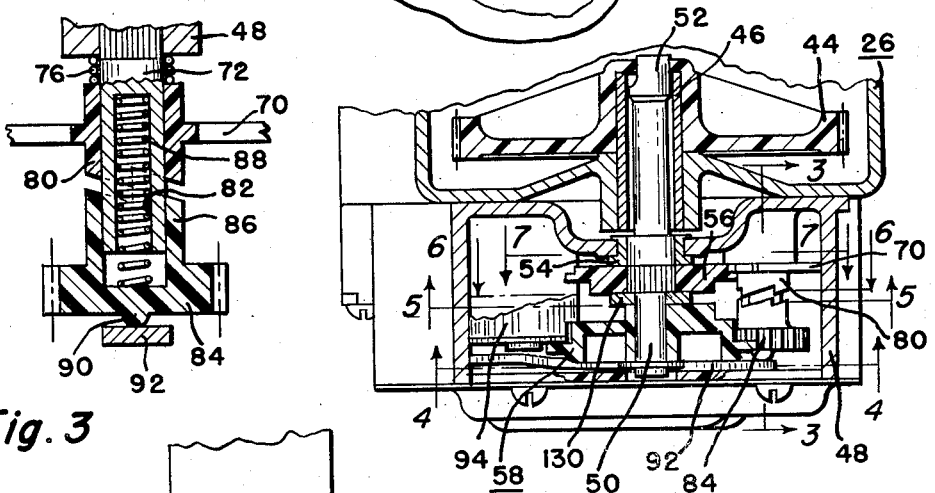
Fig. 3
Fig. 2
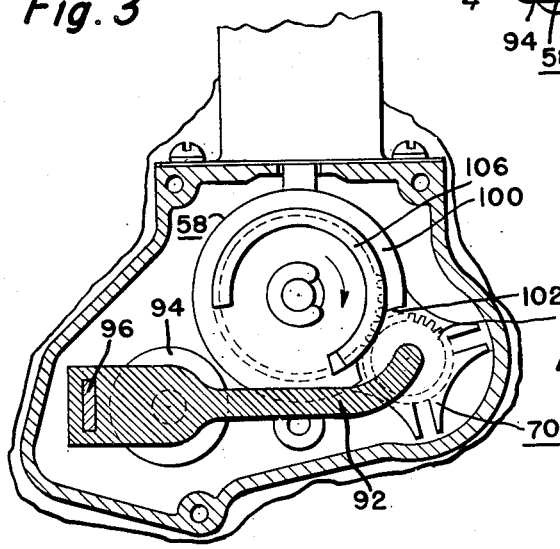
Fig. 4
INVENTOR.
Eugene R. Ziegler
BY
M. H. Strickland
His Attorney

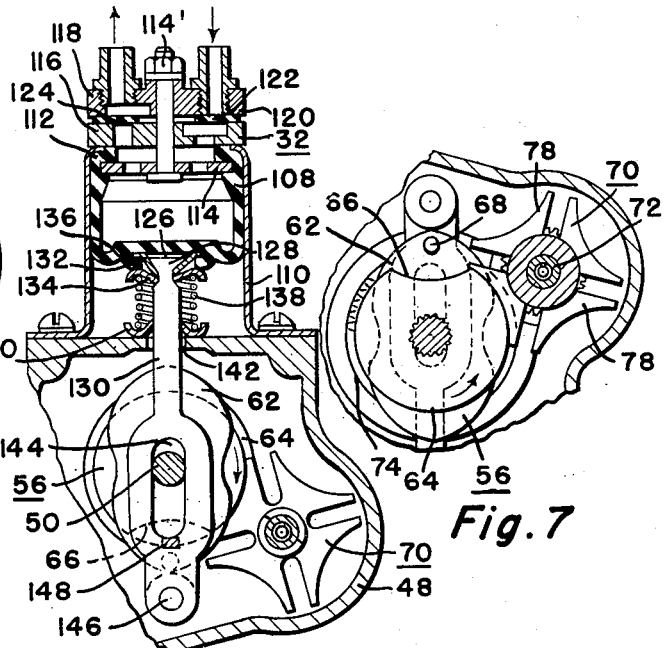
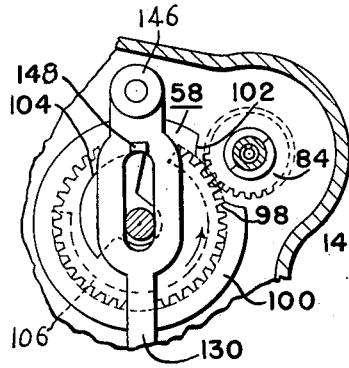
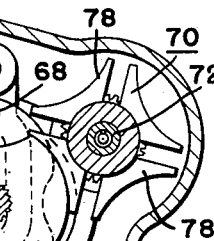
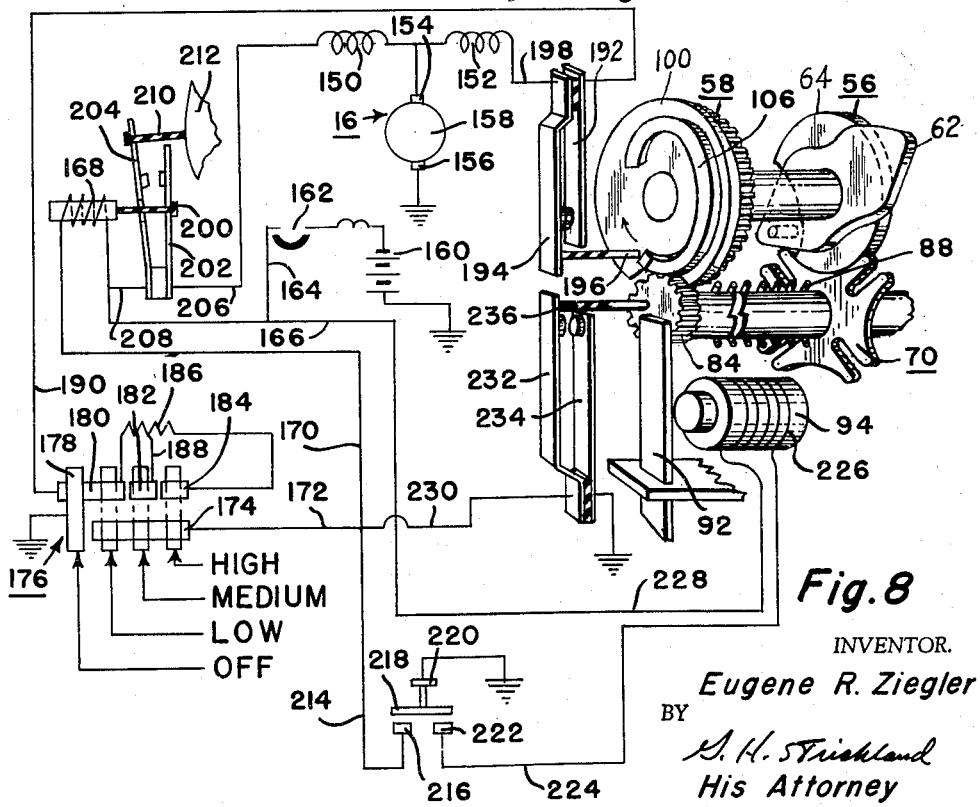
Sept. 27, 1960 — E. R. ZIEGLER — 2,953,802
WINDSHIELD CLEANING SYSTEM
Filed Jan. 10, 1958 — 2 Sheets-Sheet 2
Fig. 6
Fig. 5
Fig. 7
Fig. 8
INVENTOR.
Eugene R. Ziegler
BY
G. H. Strickland
His Attorney

United States Patent Office 2,953,802
Patented Sept. 27, 1960

2,953,802

WINDSHIELD CLEANING SYSTEM

Eugene R. Ziegler, Spencerport, N.Y., assignor to General Motors Corporation, Detroit, Mich., a corporation of Delaware Filed Jan. 10, 1958, Ser. No. 708,239

20 Claims. (Cl. 15—250.02)

This invention pertains to the art of windshield cleaning, and particularly to an improved windshield washer unit and a control system for effecting conjoint operation of a wiper unit with the washer unit.

In my earlier application Serial No. 698,504, filed November 25, 1957, a windshield cleaning system is disclosed comprising a washer unit operated by its own motor and a wiper unit operated by its own motor. In this system, the programing device for controlling the automatic conjoint operation of both units comprises a Geneva motion. In my application Serial No. 634,867, filed January 18, 1957, a windshield cleaning system utilizing a single motor for actuating a wiper unit and a washer unit is disclosed wherein the programing device comprises a ratchet cam for counting the strokes of the wiper unit during automatic conjoint operation of the wiper unit and the washer unit. The present invention relates to a cleaning system including a wiper unit and a washer unit, the wiper unit having a continuous driving connection with an electric motor, and the washer unit having an interruptible driving connection with the motor in combination with a Geneva motion type programing device.

Accordingly, among my objects are the provision of a windshield cleaning system including a wiper unit, a washer unit and means for effecting conjoint operation of both units; the further provision of a control system for a wiper unit and a washer unit wherein the washer unit is driven for a predetermined number of wiper strokes and is thereafter arrested; the further provision of a control system wherein operation of the wiper unit continues for a predetermined number of wiper strokes after the washer unit has been arrested to dry the windshield; and the still further provision of a control system for actuating a wiper unit and a washer unit from a single motor including Geneva motion means for controlling the washing and drying periods of an automatic cleaning cycle.

The aforementioned and other objects are accomplished in the present invention by drivingly interconnecting a Geneva wheel to the worm gear of a wiper motor. Specifically, the wiper unit may be of the type shown in copending application Serial No. 686,432, filed September 26, 1957, in the name of Harry W. Schmitz and assigned to the assignee of this invention. Thus, the wiper unit comprises a unidirectional motor which is connected to a crank assembly having a running orbit and a parking orbit. A pair of wiper arm and blade assemblies are drivingly connected to the crank assembly, and have imparted thereto asymmetrical oscillation throughout a running stroke and a parking stroke depending upon the orbit of the crank assembly.

The washer unit comprises an intermittent squirt type pump which is operable to deliver liquid solvent onto a windshield in timed relation with the stroking of the wiper blades. To achieve this result, the crank assembly of the wiper unit is driven from a worm gear such that a complete revolution of the worm gear results in an inboard and an outboard stroke of the wiper blades. The worm gear is drivingly connected to a shaft having a disc attached thereto. The disc has a single upstanding pin constituting a driving element for a Geneva wheel rotatably journalled on a shaft and having a sleeve portion formed with a dog tooth clutch member. The Geneva wheel has a plurality of circumferentially spaced peripheral notches such that during each revolution of the worm gear and the driving disc, the Geneva wheel and its sleeve will rotate throughout a predetermined angle.

The dog tooth clutch member on the Geneva wheel sleeve can be engaged with a complementary dog tooth clutch member formed on a sleeve integral with a pinion gear. The pinion gear is slidably and rotatably mounted on the same shaft as the Geneva wheel. When the two dog tooth clutch members are in driving engagement, the intermittent motion imparted to the Geneva wheel is imparted to the pinion gear. When the pinion gear is driven, it imparts movement to a programing wheel having a toothed periphery. The programing wheel is rotatably journalled on the shaft carrying the driving disc for the Geneva wheel, and has a lockout cam extending throughout an arcuate distance of somewhat less than 180°, and a face cam for actuating a switch. The driving disc for the Geneva wheel is integral with a two-lobe cam, or eccentric, with which the follower of a reciprocatory pump rod engages. Since the disc and pump rod cam are actuated in unison with the worm gear, actuation of the pump rod will be in timed relation with the stroking movement of the wiper blades.

The washer pump comprises a bulb of rubber or rubber-like material, to which one end of the pump rod is attached. A coil spring is interposed between the bulb and the housing containing the driving mechanism, the coil spring acting to compress the bulb and effect the delivery stroke of the pump. The pump rod has an upstanding lug engageable with the lockout cam on the programing wheel, such that when the lug engages the lockout cam, reciprocation of the pump rod is prevented. Thus, it may be said that the pump rod has an interruptible driving connection with the wiper motor. The lug and the follower on the pump rod extend in opposite directions.

The pinion gear having the dog tooth clutch member can be moved into driving engagement with the complementary clutch member of the Geneva wheel upon momentary energization of the electromagnet. Simultaneously with momentary energization of the electromagnet, the wiper motor is energized so as to impart rotation to the worm gear. As soon as the Geneva wheel has been moved throughout a distance of one notch, the electromagnet can be deenergized since the programing wheel has a flange which engages the pinion gear and maintains the pinion gear drivingly connected to the Geneva wheel. Moreover, as soon as the pinion gear has been rotated throughout a distance of one notch so as to drive the programing gear, the pump rod lug is disengaged from the lockout cam whereupon the pump will be intermittently actuated in timed relation with the stroking movement of the wiper blades. After a predetermined number of strokes of the wiper blades, as determined by the arcuate extent of the lockout cam, the pump rod lug will be reengaged with the lockout cam thereby interrupting the driving connection between the pump and the wiper motor, and during continued rotation of the programing wheel back to its initial position, that is, throughout one revolution, the wiper unit alone will be operative for a predetermined number of wiper strokes to dry the windshield. When the programing wheel has completed one revolution, the pinion gear is aligned with an arcuate notch in the flange of the programing wheel, and as the pinion gear is spring biased outwardly to a disengaged position with the Geneva wheel, the driving connection between the Geneva wheel and the pinion gear will be interrupted. Outward movement of the pinion gear also actuates a switch so that the wiper motor will be automatically deenergized after the crank assembly has moved into its parking orbit and the blades arrive at the depressed parked position against the cowl of the vehicle.

Further objects and advantages of the present invention will be apparent from the following description, reference being had to the accompanying drawings wherein a preferred embodiment is clearly shown.

In the drawings:

Figure 1 is a fragmentary view with certain parts broken away depicting a vehicle equipped with the cleaning mechanism of this invention.

Figure 2 is a fragmentary view, partly in section and partly in elevation, of the driving and programing mechanism for the cleaning system of this invention.

Figures 3 through 7 are fragmentary sectional views taken along lines 3—3, 4—4, 5—5, 6—6, and 7—7 respectively of Figure 2.

Figure 8 is a combined diagrammatic and electrical schematic of the control system for the cleaning system of this invention.

With particular reference to Figure 1, a portion of a vehicle is shown including a windshield 10, a cowl 12 and a firewall 14. The windshield cleaning apparatus includes a wiper unit comprising a unidirectional electric motor 16 suitably attached to the firewall 14, and having continuous driving connection with a crank assembly 18. The inner ends of drive links 20 are rotatably connected to the crank assembly 18, the outer ends of the driving links being connected to spaced pivot shafts, not shown, to which wiper arms 22 are drivingly connected. The wiper arms 22 carry wiper blades 24 which are movable over asymmetrical paths across the outer surface of the windshield. The crank assembly 18 and the drive mechanism therefor, which is contained in a housing 26, is of the type shown in the aforementioned copending application Serial No. 686,432 and thus the crank assembly 18 has a running orbit wherein blades 24 are oscillated throughout a running stroke, the inboard end of which is above the cowl 12 of the vehicle. The crank assembly 18 also has a parking orbit wherein the path of movement of the wiper blades is shifted so that the inboard stroke end is against the cowl of the vehicle, and when the crank assembly 18 operates in its parking orbit the motor 16 is automatically deenergized when the blades 24 arrive at the depressed park position as shown in Figure 1.

The vehicle is also equipped with a washer unit comprising a solvent reservoir 28 to which is connected an intake hose 30, the intake hose connecting with a check valve assembly 32 attached to a pump assembly 34. The check valve assembly 32 is also connected to a delivery conduit 36 which communicates with a T-coupling 38. Delivery hoses 40 are connected to the T-coupling, the hoses 40 connecting with washer nozzles 42 through which liquid solvent is discharged onto the windshield into the paths of the moving wiper blades 24.

With particular reference to Figures 2 through 7, the washer unit has an interruptible driving connection with the wiper motor 16. As seen particularly in Figure 2, a worm gear 44 is rotatably mounted by a sleeve bearing 46 carried by the housing 26. The worm gear 44 is driven by means of a worm, not shown, from the motor 16. Moreover, one revolution of the worm gear 44 effects a complete revolution of the crank assembly 18 so that during each revolution of the worm gear 44 the wiper blades 24 move through an inboard stroke and an outboard stroke.

A washer unit control housing 48 is attached to the housing 26. The housing 48 has a shaft 50 rotatably journalled therein, the shaft 50 having a driving connection indicated by numeral 52 with the worm gear 44. The shaft 50 is journalled in the housing 28 by a bearing 54. The shaft 50 has a disc and cam assembly 56 drivingly connected thereto and a programing wheel 58 rotatably journalled thereon. The disc 56 and the programing wheel 58 are maintained in axially spaced relation by a pump rod 130.

As seen in Figures 5 and 7, the cam and disc assembly 56 is formed with a two-lobe cam 62 and a disc 64 having an arcuate cut-out portion 66. The cam 62 has an upstanding pin 68 extending towards the disc 64. The pin 68 constitutes the driving member for a Geneva wheel 70 which is rotatably journalled on a shaft 72 rigidly attached to the housing 48. As seen in Figure 3, the Geneva wheel 70 is resiliently maintained in engagement with a flange 74 on the disc assembly 56 by a spring 76. The Geneva wheel has four notched teeth 78 adapted to sequentially receive the pin 68. The teeth are connected by surfaces of concave configuration which coact with the periphery of the disc 64 so as to prevent rotation of the Geneva wheel 70 at all times except when the pin 68 engages one of the notches therein. It will be apparent that in order to effect one complete revolution of the Geneva wheel 70, the cam and disc assembly 56 will have to make four revolutions.

The Geneva wheel 70 is integral with a sleeve constituting a dog toothed clutch member 80. As seen in Figure 3, the shaft 72 is formed with a recess 82, and pinion gear 84 is rotatably journalled on the shaft 72. The pinion gear 84 includes a sleeve constituting a second dog tooth clutch member 86. The dog toothed clutch members 80 and 86 are normally maintained out of engagement by a compression spring 88 disposed within the shaft recess 82, one end of the spring 88 engaging the shaft and the other end engaging the pinion gear 84. The pinion gear 84 is formed with a hemispherical protrusion 90 engageable with an armature 92 of an electromagnet 94 mounted within the housing 48. When the electromagnet 94 is energized, the armature 92 which is pivotally mounted on the frame 96 of the electromagnet, moves upwardly as viewed in Figure 2 and thereby moves the pinion 84 so that the dog toothed members 86 and 80 are in engagement. Accordingly, the intermittent rotary movement imparted to the Geneva wheel 70 will be imparted to the pinion gear 84.

The pinion gear 84 meshes with the toothed periphery 98 of the programing wheel 58. The programing wheel 58 also has a flange portion 100 with an arcuate notch 102 that is aligned with the pinion gear 84 when the programing wheel is in the "off" position as shown in Figures 2, 4 and 6. However, as soon as the pinion gear 84 has been moved inwardly by the electromagnet and has been rotated by the Geneva wheel so as to rotate the programing wheel 58, the electromagnet 94 can be deenergized since the pinion gear 84 is held in engagement with the Geneva wheel by the flange 100 of the programing wheel. The programing wheel also includes a lockout cam 104 of an arcuate extent somewhat less than 180° and a face cam 106 of an arcuate extent somewhat greater than 180°.

With reference to Figure 5, the washer pump includes an elastomeric bulb, or bellows, 108 disposed within a housing 110 attached to the housing 48. The open end of the bulb 108 is formed with a lip 112 which is clamped between a perforated plate 114 and the check valve assembly 32 by a bolt 114. The check valve assembly 32 includes a lower plate 116, an upper plate 118 and a rubber disc 120 disposed therebetween. The rubber disc 120 has an inlet flap type check valve 122 and an outlet flap type check valve 124.

The closed end of the bulb 108 is formed with a depression 126 which receives an enlarged end 128 of a reciprocatory pump rod 130. The enlarged end 128 is rigidly attached to the bulb 108 by a pair of washers 132 and 134 which embrace a lip 136 which overhangs the depression 126. The washer 134 also constitutes a spring retainer for one end of a coil compression spring 138, the other end of which engages a spring retainer 140 which circumscribes the pump rod 130 and abuts the housing 48.

The pump rod 130 extends through a hole 142 in the housing 48, and is formed with an elongate longitudinal slot 144 through which the shaft 50 extends. In addition, the pump rod 130 carries a follower roller 146 which extends in one direction and engages the cam 62 and a follower lug 148 which extends in the opposite direction is engageable with the lockout cam 104. The spring 138 maintains the follower 146 in engagement with the cam 62. In addition, the spring 138 is operative to collapse the bulb 108 so as to effect the delivery stroke, when the cam 62 is rotated to a position wherein the follower 146 engages the cam dwell. Upon continued rotation of the cam 62, the rod 130 will expand the bellows 108 as the follower 146 engages the cam rise to effect the intake stroke of the pump. When the lug follower 148 engages the lockout cam on the programing wheel 58, the driving connection between the follower 146 and the cam 62 is interrupted so that rotation of the cam 62 will not actuate the washer pump.

With particular reference to Figure 8, the energizing circuits for the wiper motor 16 for independent actuation of the wiper unit or conjoint operation of the washer unit and the wiper unit will be described. The motor 16 is of the compound wound type and includes a series field winding 150 and a shunt field winding 152, the inner ends of which are connected to a commutator brush 154. The other commutator brush 156 is connected to ground, and the brushes 154 and 156 are electrically connected with the motor armature 158. The motor 16 can be energized from a battery 160, one terminal of which is connected to ground and the other terminal of which is connected through a thermal overload switch 162 to a wire 164. Wire 164 connects with a wire 166 which is connected to a relay coil 168, the other end of the relay coil being connected to a wire 170. Wire 170 connects with a wire 172 and a stationary switch contact 174. The stationary switch contact 174 constitutes a part of the manual wiper unit control switch 176, which also includes a movable bridging contact 178, and stationary contacts 180, 182 and 184. Contacts 180 and 184 are interconnected by a resistor 186, having a center tap 188 connected to the contact 182. Bridging contact 178 is connected to ground.

Contact 180 is connected to a wire 190 which connects with a leaf spring switch contact 192. Leaf spring switch contact 192 is engageable with a leaf spring switch contact 194 having a follower 196 engageable with the face cam 106 on the programing wheel 58. The leaf spring switch contact 194 is connected to a wire 198 that is connected to the other end of a shunt field winding 152. The relay coil 168 controls a plunger 200 operable to move a leaf spring switch contact 202 into engagement with a leaf spring switch contact 204, these parts constituting the parking switch of the wiper motor. The contact 202 is connected to a wire 206, and the contact 204 is connected to a wire 208 which connects with the wire 166. Wire 206 connects with the other end of the series field winding 150. The contact 204 carries a follower 210 engageable with a cam 212, the cam 212 being operable to separate contacts 202 and 204 when the crank assembly operates in its parking orbit, the relay coil 168 is deenergized, and the wiper blades arrive at the depressed park position against the cowl 12 of the vehicle. During operation of the crank assembly in the running orbit, the cam 212 does not engage the follower 210. In addition, upon energization of the relay coil 168, contact 202 will be moved into engagement with the contact 204 irrespective of whether the follower 210 engages cam 212, or not.

The wire 170 is also connected to a wire 214 which is connected to a stationary switch contact 216. The stationary switch contact 216 can be engaged by a contact 218 movable by a pushbutton 220. The contact 218 is connected to ground, and the pushbutton 220 is resiliently biased to the open circuit position by suitable resilient means, not shown. The contact 218 is also engageable with a contact 222 connected to a wire 224, which is connected to the coil 226 of the electromagnet 94. The other end of the coil 226 is connected to a wire 228 which is connected to the wire 164. In addition, the wire 170 is connected to a wire 230 which is connected to a leaf spring switch contact 232. Leaf spring switch contact 232 is engageable with leaf spring contact 234 that is connected to ground. The contact 232 has a follower 236 engageable with the face of pinion gear 84 such that when the pinion gear 84 is drivingly connected with the Geneva wheel 70, the contacts 232 and 234 are in engagement.

Independent operation of the wiper unit arrangement is controlled by the switch 176. When the bridging contact 178 is moved from the "off" position to the low speed position, contacts 174 and 180 are connected to ground. Accordingly, the relay coil 168 will be energized from the battery through the overload switch 162, wires 164 and 166, coil 168, wires 170 and 172 and contacts 174 and 178. Upon energization of the coil 168, contact 202 will be moved into engagement with contact 204 so that the motor 16 will be energized from the battery through the overload switch 162, wires 164, 166 and 208, contacts 204 and 202, wires 206, series field winding 150, brush 154, armature 158 and brush 156. At the same time, the shunt field winding 152 will be fully energized from the series field winding through wire 198, contacts 194 and 192, which are always in engagement with the programing wheel 58 in the "off" position, wire 190 and switch contacts 180 and 178.

When the bridging contact 178 is moved to the medium speed position, energization of the shunt field winding 152 is reduced since a portion of the resistor 186 is connected in series therewith. To obtain high speed rotation of the motor 16, contact 178 is moved from the bridging contacts 184 and 174 wherein the entire resistor 186 is connected in series with the shunt field winding 152.

When the bridging contact 178 is moved from any of the "on" position to the "off" position, the relay coil 168 is deenergized. However, contacts 202 and 204 remain in engagement and thus the motor 16 continues to be energized for low speed rotation. Upon deenergization of the relay coil 168, and in accordance with the disclosures of the aforementioned copending application, Serial No. 686,432, the crank assembly 18 will move into its parking orbit, and when the wiper blades arrive at the depressed parked position, as shown in Figure 1, the cam 212 will engage the follower 210 so as to move contact 204 out of engagement with contact 202 thereby deenergizing the motor 16.

To initiate an automatic cleaning cycle wherein the wiper unit and the washer unit operate conjointly, it is only necessary to momentarily close the push button switch 220. When the bridging contact 218 is moved into engagement with contacts 216 and 222, the relay coil 168 will be energized from the battery through overload switch 162, wires 164 and 166, the coil 168, wires 170 and 214 and contacts 216 and 218. At the same time, electromagnet 94 will be energized from the battery through overload switch 162, wires 164 and 228, the coil 226, wire 224 and contacts 222 and 218. Accordingly, switch contact 202 will be moved into engagement with switch contact 204 to energize the motor 16. At the same time, the electromagnet armature 92 will move towards the core of the electromagnet thereby moving the pinion gear 84 so that the clutch members 80 and 86 are in driving engagement. As soon as the motor 16 is energized, rotation will be imparted to the worm gear 44, and rotation of the worm gear 44 will actuate the crank assembly 18 of the wiper unit and the disc and cam assembly 56. The disc and cam assembly 56 will impart intermittent rotary movement to the Geneva wheel 70, and since the clutch members 80 and 86 are in engagement, the pinion gear 84 will likewise be driven intermittently. After the first 90° movement of the Geneva wheel 70 and the pinion gear 84, the programing wheel 58 will be driven in the clockwise direction as indicated in Figure 4 so that the flange 100 will engage the face of the pinion gear 84, whereupon the electromagnet 94 can be deenergized. In addition, since the pinion gear 84 has been shifted to the right as viewed in Figure 8, switch contact 232 will engage switch contact 234, so that release of the push button switch 220 will not interrupt energization of the relay coil 168. Thus, the relay coil 168 will now be energized from the battery through the overload switch 162, wires 164 and 166, coil 168, wires 170 and 230 and contacts 232 and 234.

Moreover, the initial movement imparted to the programing wheel 58 causes the follower 196 to engage the face cam 106 and separate contacts 192 and 194, thereby open circuiting the shunt field winding 152 so that the motor 16 operates as a series motor and runs at high speed. In addition, the first movement imparted to the programing wheel 58 is sufficient to move the lockout cam 104 out of engagement with the follower lug 146 on the pump rod 130, so that the driving connection between the cam 62 and the pump rod is established. Accordingly, as the worm gear 44 rotates liquid solvent will be intermittently squirted onto the windshield in timed relation with movement of the wiper blades, since during each stroke of the wiper blades, the worm gear moves throughout one-half revolution as does the cam and disc assembly 56. Therefore, during each stroke of the wiper blades the washer pump completes an intake stroke and a delivery stroke.

Moreover, during each revolution of the cam and disc assembly 56, the Geneva wheel 70 is moved throughout an angular distance of 90°. The gear ratio between the pinion gear 84 and the programing wheel 58 will be such that two complete revolutions of the pinion gear 84 are required to effect one complete revolution of the programing wheel 58. Moreover, the angular extent of the lockout cam 104 and the face cam 106 will be such that the programing wheel must be rotated throughout 225° before the follower lug 146 reengages the lockout cam 104. Accordingly, the washer unit will be operative to discharge liquid solvent for ten complete strokes of the wiper blades, or twenty single strokes, after which the lug 146 will reengage the lockout cam 104 so that the pump will be rendered inoperative. However, the Geneva wheel 70 will continue to be intermittently driven, as will the pinion gear 84 and the programing wheel 58 throughout six complete wiper strokes, or twelve single wiper strokes, constituting a drying period. When the lug 148 reengages the lockout cam 104, the follower 196 is disengaged from the face cam 106, so that the motor 16 rotates at low speed during the drying period. When the programing wheel 58 has completed one revolution, the pinion gear 84 is again aligned with the arcuate cut-out portion 102 in the flange 100 thereby permitting the spring 88 to move the pinion gear 84 to the left as viewed in Figure 8, thereby disengaging clutch member 86 from the clutch member 80. At the same time, the contact 232 will be moved out of engagement with the contact 234 by follower 236 to deenergize relay coil 168. Therefore, the crank assembly 18 will move into the parking orbit, and when the wiper blades arrive at the depressed park position, the motor 16 will be deenergized by operation of the parking switch contacts 202 and 204.

From the foregoing, it is apparent that the present invention embodies a unique arrangement for effecting automatic conjoint operation of a wiper unit and a washer unit, the washer unit being operative for a predetermined number of wiper unit strokes after which it is automatically arrested. The wiper unit continues to operate for a second predetermined number of wiper strokes, constituting a drying period, or cycle, after which the wiper unit is automatically arrested. In addition, the wiper unit can be operated independently of the washer unit.

While the embodiment of the invention as herein disclosed constitutes a preferred form, it is to be understood that other forms might be adopted.

What is claimed is as follows:

1. A windshield cleaning system including, a wiper unit, a washer unit, means to set both units in operation for conjoint operation, and means including a Geneva motion device driven by said wiper unit and programming means actuated by said Geneva motion device to automatically arrest the two units in sequential order that prolongs wiper unit operation for a predetermined number of wiper strokes after washer unit operation is arrested.

2. A windshield cleaning system including, a wiper unit, a washer unit, means to set both units in operation for conjoint operation, a Geneva motion device driven by said wiper unit during said conjoint operation and stroke counting means driven by said Geneva motion device during said conjoint operation for continuing operation of said washer unit for a predetermined number of wiper unit strokes and then automatically arresting said washer unit.

3. A windshield cleaning system including, a wiper unit, a washer unit, a single motor for effecting operation of both units, means to activate said motor to set both units in operation for conjoint operation, and means including a Geneva motion device driven by said wiper unit and programming means actuated by said Geneva motion device to automatically arrest the units in sequential order that prolongs wiper unit operation for a predetermined number of wiper strokes after washer unit operation is arrested.

4. A windshield cleaning system including, a wiper unit, a washer unit, a single motor for effecting operation of both units, means to activate said motor to set both units in operation for conjoint operation, a Geneva motion device driven by said wiper unit during conjoint operation, and stroke counting means driven by said Geneva motion device during said conjoint operation for continuing operation of said washer unit for a predetermined number of wiper strokes and then automatically arresting said washer unit.

5. Windshield cleaning apparatus including, a solvent reservoir, a power driven pump connectible with the reservoir and operable to deliver solvent onto a windshield, a power driven wiper unit operable to wipe the windshield, means to actuate said pump and said wiper unit to effect conjoint operation thereof, a Geneva motion device driven by said wiper unit during said conjoint operation and stroke counting means driven by said Geneva motion device during said conjoint operation for continuing operation of said pump for a predetermined number of wiper unit strokes and then automatically arresting said pump.

6. Windshield cleaning apparatus including, a washer unit, a control for the washer unit, a wiper unit, a control for the wiper unit, a Geneva motion device driven by said wiper unit during conjoint operation of said washer unit and said wiper unit, and a wiper unit stroke control driven by said Geneva motion device during said conjoint operation for automatically arresting operation of said washer unit after a predetermined number of wiper unit strokes, said stroke control being set in operation by said washer unit control.

7. A windshield cleaning system including, a wiper unit, a washer unit, a single motor for operating both units, said motor having continuous driving connection with said wiper unit and an interruptible driving connection with said washer unit, and means for establishing the driving connection between said motor and said washer unit to effect conjoint operation of both units including a Geneva motion device driven by said wiper unit and programming means driven by said Geneva motion device for controllng the interval of said conjoint operation.

8. A windshield cleaning system including, a wiper unit, a washer unit including a pump, an electric motor having a continuous driving connection with said wiper unit and an interruptible driving connection with said pump, control means for said motor to effect conjoint operation of said wiper unit and said washer unit by energizing said motor and establishing the driving connection between said motor and said pump, a Geneva motion device driven by said wiper unit during said conjoint operation, and stroke counting means driven by said Geneva motion device during said conjoint operation for continuing operation of said washer unit for a predetermined number of wiper unit strokes and then automatically arresting said washer unit.

9. The system set forth in claim 8 including control means for energizing said motor without establishing the driving connection between said motor and said pump to effect independent operation of the wiper unit.

10. A windshield cleaning system including, a wiper unit, a washer unit, an electric motor having a continuous driving connection with said wiper unit and an interruptible driving connection with said washer unit, a circuit for energizing said motor including means for establishing the driving connection between said motor and said washer unit to effect conjoint operation of said wiper unit and said washer unit, a Geneva motion device driven by said wiper unit during said conjoint operation, and stroke counting means driven by said Geneva motion device during said conjoint operation for continuing operation of said washer unit for a predetermined number of wiper unit strokes and then automatically arresting said washer unit.

11. The cleaning system set forth in claim 10 wherein said circuit for energizing said motor includes an electromagnet, and wherein said stroke counting means continues operation of said wiper unit for a second predetermined number of wiper strokes after the washer unit has been arrested, and then automatically arrests operation of said wiper unit.

12. The cleaning system set forth in claim 10 wherein said Geneva motion device includes a Geneva wheel having an intermittent driving connection with said motor, and means connectible with said Geneva wheel for controlling the driving connection between said motor and said washer unit.

13. The cleaning system set forth in claim 12 wherein the connection between said Geneva wheel and said last recited means comprises a pinion gear clutchable to said Geneva wheel.

14. A washer pump for a vehicle windshield including, a motor having a rotating element, an eccentric driven by said element, a reciprocable pump rod having a first follower engageable with said eccentric so as to be reciprocated during rotation thereof, a washer pump including a fluid displacing member having an intake stroke and a delivery stroke, resilient means acting constantly upon said member to effect the delivery stroke thereof, said rod being connected to said member for effecting the intake stroke thereof, a lockout cam coaxial with said eccentric, a second follower on said pump rod engageable with said lockout cam for interrupting the driving connection between said pump rod and said eccentric, an interruptible, intermittent driving connection between said eccentric and said lockout cam whereby each revolution of said eccentric imparts a predetermined angular movement to said lockout cam, and means for establishing said intermittent driving connection.

15. The pump set forth in claim 14 wherein said last recited means includes an electromagnet.

16. The pump set forth in claim 14 wherein said eccentric has an upstanding pin thereon, and wherein said intermittent driving connection includes a Geneva wheel drivingly connected with said pin.

17. The pump set forth in claim 16 wherein said Geneva wheel is formed with a clutch element, a pinion gear having a complementary clutch element coaxial with the clutch element of said Geneva wheel, and means for engaging said clutch elements.

18. The pump set forth in claim 14 wherein said lockout cam has a flange with an arcuate cut-out, and wherein said intermittent driving connection includes a pinion gear engageable with said lockout cam, said flange maintaining said intermittent driving connection after a predetermined angular movement thereof until said pinion gear is again aligned with said arcuate cut-out.

19. The pump set forth in claim 14 wherein the means for establishing the intermittent driving connection comprises an electromagnet, a pinion gear movable axially by said electromagnet, and wherein said pinion gear actuates switch means for continuing energization of said motor for a complete revolution of said lockout cam.

20. The pump set forth in claim 19 wherein said intermittent driving connection includes a Geneva wheel driven by said eccentric, and wherein energization of said electromagnet drivingly connects said pinion gear with said Geneva wheel.

References Cited in the file of this patent

UNITED STATES PATENTS 2,816,316     Oishei  ---------------- Dec. 17, 1957